United States Patent
Rofrano et al.

(10) Patent No.: US 10,839,168 B2
(45) Date of Patent: Nov. 17, 2020

(54) DYNAMIC AUTOMATION OF PIPELINE CREATION

(71) Applicant: International Business Machines Corporation, Armonk, NY (US)

(72) Inventors: John Rofrano, Mahopac, NY (US); Anup Kalia, Elmsford, NY (US); Constantin M. Adam, Fairfield, CT (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 16/278,952

(22) Filed: Feb. 19, 2019

(65) Prior Publication Data

US 2020/0265118 A1    Aug. 20, 2020

(51) Int. Cl.

| | |
|---|---|
| *G06F 40/40* | (2020.01) |
| *G06F 16/242* | (2019.01) |
| *G06F 8/60* | (2018.01) |
| *G06F 8/30* | (2018.01) |
| *G06N 5/04* | (2006.01) |

(52) U.S. Cl.
CPC ............... *G06F 40/40* (2020.01); *G06F 8/30* (2013.01); *G06F 8/60* (2013.01); *G06F 16/243* (2019.01); *G06N 5/04* (2013.01)

(58) Field of Classification Search
CPC combination set(s) only.
See application file for complete search history.

(56) References Cited

U.S. PATENT DOCUMENTS

| | | | |
|---|---|---|---|
| 9,477,451 B1 | 10/2016 | O'Farrell | |
| 2013/0117204 A1* | 5/2013 | Vadlamani | G06N 5/022 706/12 |
| 2017/0180459 A1 | 6/2017 | Frank et al. | |
| 2017/0371636 A1 | 12/2017 | Palavalli et al. | |
| 2019/0065040 A1* | 2/2019 | Carrier | G06F 3/04847 |
| 2019/0354720 A1* | 11/2019 | Tucker | G06F 21/6254 |
| 2020/0159552 A1* | 5/2020 | Bodin | G06F 8/72 |
| 2020/0160458 A1* | 5/2020 | Bodin | G06Q 10/101 |

OTHER PUBLICATIONS

Assis, Eldad, Easily Automate Your CI/CD Pipeline with Jenkins, Helm, and Kubernetes, DevOps Zone, Tutorial, Mar. 4, 2018.
Seshadri, Bhargavi, Pipeline Automation: The Axle of Any Successful DevOps Implementation, DevOps Zone, Opinion, Dec. 8, 2017.

* cited by examiner

*Primary Examiner* — Mohammad K Islam
(74) *Attorney, Agent, or Firm* — Lieberman & Brandsdorfer, LLC

(57) ABSTRACT

An intelligent computer platform to provide intent identification, mining and refinement, and dynamic application of the intent to pipeline. Natural language processing (NLP) is utilized with respect to the intent identification and refinement. A pipeline tool to support the function of the intent is identified, and a corresponding dynamic modification of a corresponding pipeline template takes place to integrate the tool into a stage of the corresponding template. Program code that aligns with the dynamic modification of the pipeline template is generated, thereby incorporating the searched intents into the functional aspect(s) represented in the pipeline.

18 Claims, 16 Drawing Sheets

DYNAMIC AUTOMATION OF PIPELINE CREATION

BACKGROUND

The present embodiments relate to natural language processing. More specifically, the embodiments relate to recognizing intent present within an electronic communication and resolving the recognized intent with respect to pipeline compliance and development.

In the field of artificially intelligent computer systems, natural language systems (such as the IBM Watson® artificially intelligent computer system or and other natural language interrogatory answering systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

SUMMARY

The embodiments include a system, computer program product, and method for intent recognition and dynamic application of the intent to a corresponding pipeline.

In one aspect, a system is provided for use with an artificial intelligence (AI) computer platform to dynamically integrate natural language processing (NLP) with intent identification and evaluation, and application to a corresponding pipeline. The AI platform is provided with tools to support the dynamic integration. The tools include a source manager, a cognitive assessment tool, and a pipeline manager. The source manager is configured to search a source feed for intents and to translate the searched intents to one or more action that are executable by a pipeline template. The cognitive assessment tool is configured to refine the searched intents, and apply this refinement to enhance the matching of the intents to a corresponding pipeline tool. The pipeline manager is configured to dynamically modify the pipeline template. This dynamic modification includes integrating the matched tool into an identified stage within the pipeline template. Part of the integration includes generated program code that reflects the pipeline template and associated stages. Program code is created as an executable that is aligned with the dynamically modified pipeline template.

In another aspect, a computer program device is provided for use with an intelligent computer platform for dynamically integrate natural language processing (NLP) with intent identification and evaluation, and application to a corresponding pipeline. The AI platform is provided with program code executable by a processing unit to support the dynamic integration. Program code is provided to search a source feed for intents and to translate the searched intents to one or more action that are executable by a pipeline template. In addition, program code is provided to refine the searched intents, and apply this refinement to enhance the matching of the intents to a corresponding pipeline tool. Based on the intent refinement, program code dynamically modifies the pipeline template. This dynamic modification includes integrating the matched tool into an identified stage within the pipeline template. Part of the integration includes generated program code that reflects the pipeline template and associated stages. Program code is created as an executable that is aligned with the dynamically modified pipeline template.

In yet another aspect, a method is provided for use by an intelligent computer platform for dynamically integrating natural language processing (NLP) with intent identification and evaluation, and application to a corresponding pipeline. A source feed is searched for intents and translation of the searched intents to one or more action that are executable by a pipeline template. The searched intents are subject to refinement or a refinement action, and application of this refinement to enhance the matching of the intents to a corresponding pipeline tool. The pipeline template is subject to dynamic modification, including integration of the matched tool into an identified stage within the pipeline template. Part of the integration includes generating program code that reflects the pipeline template and associated stages. Program code is created as an executable that is aligned with the dynamically modified pipeline template.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

Figure 1:
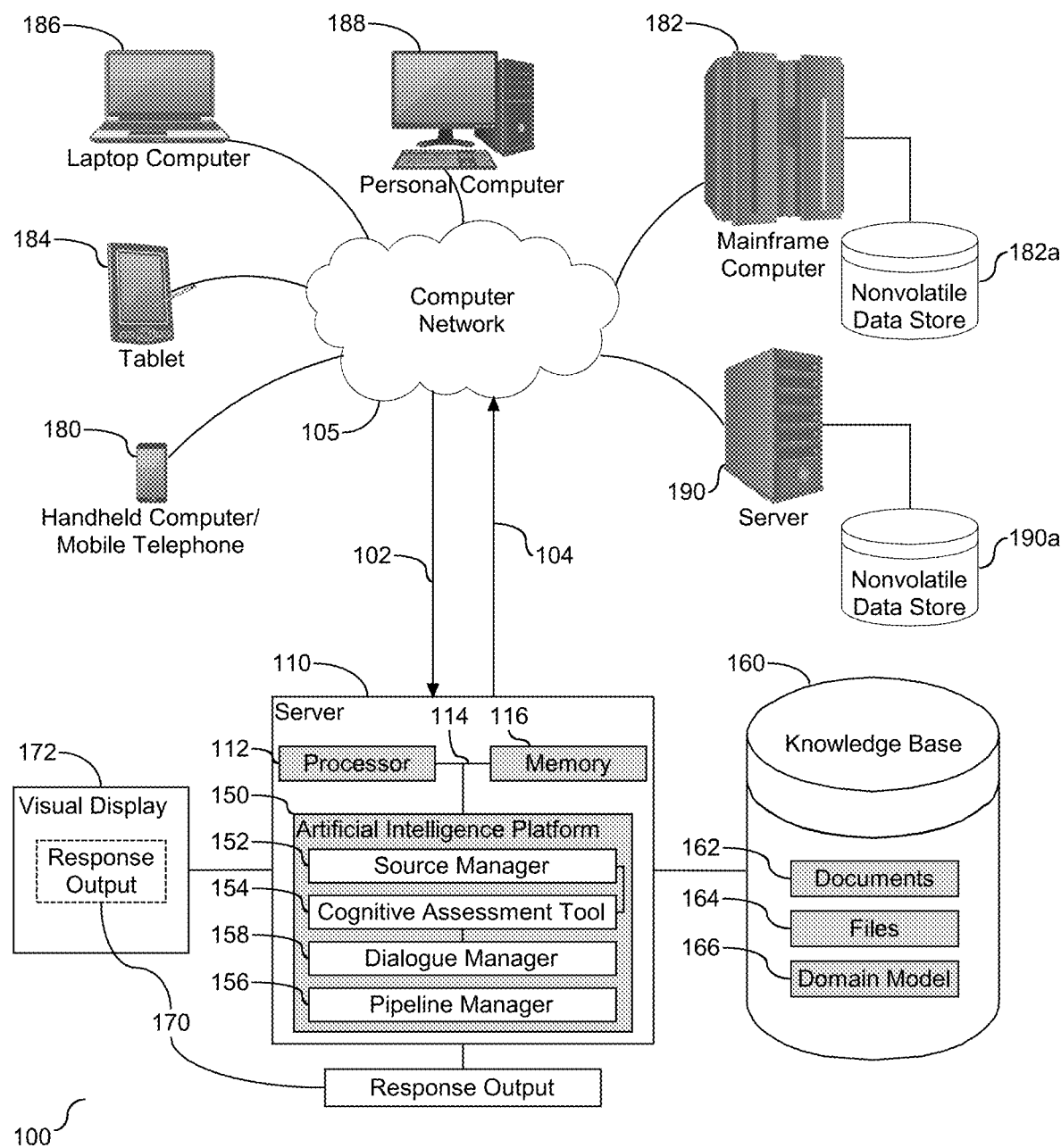
FIG. 1 depicts a schematic diagram of a natural language processing (NLP) system for use with DevOps software development.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

DevOps (a portmanteau of "development" and "operations") is a software development method that stresses communication, collaboration, integration, automation and measurement of cooperation between software developers and other information-technology (IT) professionals. DevOps acknowledges the interdependence of software development, quality assurance, and IT operations, and aims to help an organization rapidly produce software products and services and to improve reliability and security while providing faster development and deployment cycles. A continuous delivery (CD) pipeline is an automated set of processes utilized as part of or integrated into DevOps. The CD pipeline is composed of several stages. In one embodiment, the stages may include Build, Unit Test, Deploy Development, Integration Tests, Compliance Checks, and Deploy Product. An example of a pipeline template with stages and corresponding tools is shown and described in FIG. 2. Each of the stages is comprised of one or more actions or options. For example, the Test stage may employ a simple tester, an advanced tester, and/or a compliance scanner. In one embodiment, the pipeline stage may only require a selection of less than all of the available actions, to avoid redundancy and inefficiency. To address the action identification in the CD pipeline, one or more intents are identified and mapped to the pipeline stages to facilitate action requirements and corresponding identification. The intent is referred to as a non-functional requirement that characterizes or otherwise articulates features corresponding to the pipeline stage(s) and reflected in the functional aspects. In one embodiment, the intent may be specified in corresponding documentation. Accordingly, the intent identification and application to the CD pipeline enhances the functional identification of actions in one or more pipeline stages.

As shown and described herein, tools and corresponding methods are implemented to search for intents, or otherwise identify intents, and application of the intents to the CD pipeline. It is understood in the art that intents may be explicitly specified in corresponding documentation. For example, "the application needs to be PCI-DSS compliant" and "I need my application to be Highly Available" are examples of explicit intents. The tools and corresponding methods described herein are utilized to solicit or otherwise gather and identify intents that may not be explicitly articulated in the documentation. In one embodiment, the tools and corresponding methods may be utilized to further define characteristics of an identified intent. It is understood that satisfaction of the intents requires mapping the intents to a corresponding tool, and in one embodiment mapping the identified tool to a pipeline stage. An example pipeline template with stages and tools is shown and described in FIG. 2. The following table is an example of an intent to tool mapping:

TABLE 1

| Intent | Tool |
| --- | --- |
| PCI-DSS compliant | Compliance Scanner |
| No Known Vulnerabilities | Vulnerability Advisor |
| No SQL Injections | Security Static Analyzer |
| Security Penetration Testing | AppScan Dynamic Analyzer |

The tools identified and mapped to the corresponding intent is an example mapping, and should not be considered limiting. Accordingly, one or more tools are mapped or otherwise assigned to each identified intent to meet the functional aspects of the intent.

The tools and methods shown and described herein are directed to identifying intents, and in one embodiment identifying characteristic data of the intent. Referring to FIG. 1, a schematic diagram of a natural language processing (NLP) system for use with DevOps software development (100) is depicted. As shown, a server (110) is provided in communication with a plurality of computing devices (180), (182), (184), (186), (188), and (190) across a network connection (105). The server (110) is configured with a processing unit in communication with memory across a bus. The server (110) is shown with an artificial intelligence platform (150) for natural language processing over the network (105) from one or more of the computing devices (180), (182), (184), (186) and (188). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The artificial intelligence platform (150) is shown herein configured to receive input (102) from various sources. For example, artificial intelligence platform (150) may receive input from the network (105) and leverage a data source (160), also referred to herein as a corpus or knowledge base, to apply to DevOps, and in one embodiment program code alignment. As shown, the data source (160) is configured with logically grouped documents (162) and files (164), and a domain model (166). In one embodiment, the data source (160) may be configured with other or additional sources of input, and as such, the sources of input shown and described herein should not be considered limiting. Similarly, in one embodiment, the data source (160) includes structured, semi-structured, and/or unstructured content in a plurality of documents that are contained in one or more databases or corpus. The various computing devices (180), (182), (184), (186), and (188) in communication with the network (105) may include access points for the logically grouped documents (162) and files (164). Some of the computing devices may include devices for a database storing the corpus of data as the body of information used by the artificial intelligence platform (150) to generate response output (170), and to communicate the response output to a visual display (172) operatively coupled to the server or one or more of the computing devices (180)-(188) across network connection (104).

The network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in documents or files, network accessible sources and/or structured data sources. In this manner, some processes populate the artificial intelligence platform (150), with the artificial intelligence platform (150) also including input interfaces to receive requests and respond accordingly.

As shown, content may be in the form of one or more logically grouped documents or (162) or files (164) for use as part of the corpus (160) of data with the artificial intelligence platform (150). The corpus (160) may include any structured and unstructured documents, including but not limited to any file, text, article, or source of data (e.g. scholarly articles, dictionary, definitions, encyclopedia references, and the like) for use by the artificial intelligence platform (150). Content users may access the artificial intelligence platform (150) via a network connection or an internet connection to the network (105), and may submit natural language input to the artificial intelligence platform (150) that may effectively determine an output response related to the input by searching content in the corpus of data local to the data source (160) or any electronic data source operatively coupled to the server (110) across the network (105).

Figure 2:
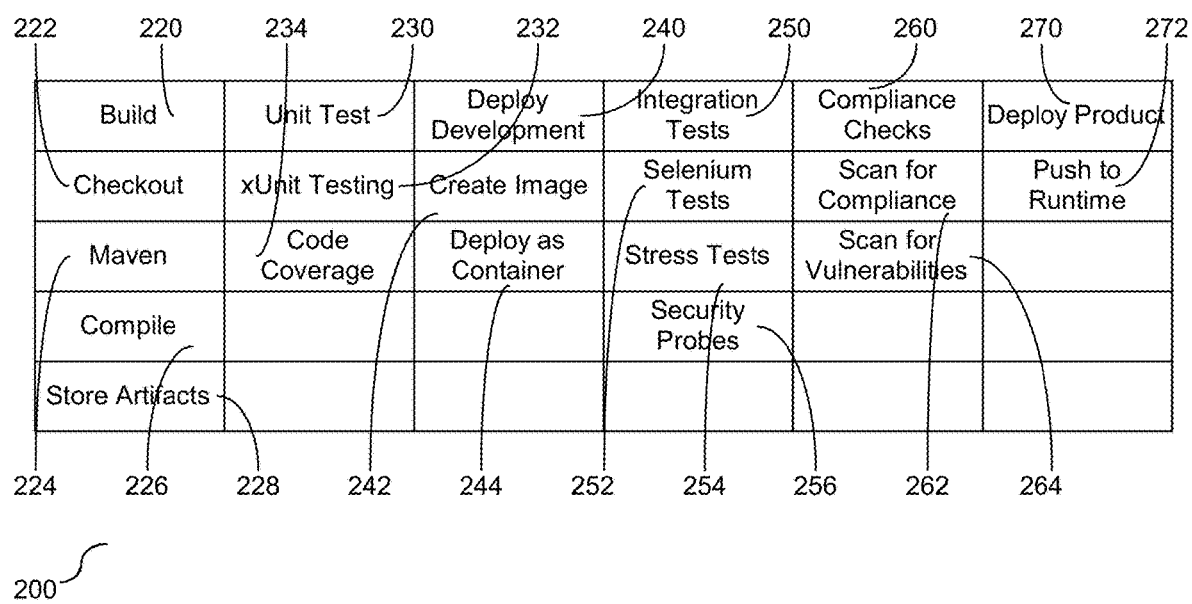
FIG. 2 depicts a block diagram of an example pipeline template.

The artificial intelligence (AI) platform (150) is shown herein with several tools to support content detection and processing, including a source manager (152), a cognitive assessment tool (154), a pipeline manager (156), and a dialogue manager (158). The source manager (152) functions to search for intents and to translate the searched intents into one or more actions. The intent mining may be with respect to a source feed (102) or an alternative input source across the network (105). A pipeline template defines a framework for program code development. The pipeline template includes multiple stages, with each stage having one or more corresponding actions that are expected or required for the program code development. Referring to FIG. 2, a block diagram (200) is provided to illustrate an example pipeline template (210). The stages of the pipeline are shown in this example template as: Build (220), Unit Test (230), Deploy Dev (240), Integration Tests (250), Compliance Checks (260), and Deploy Product (270). Each stage of the pipeline template has a selection of tools to support the general category represented in the corresponding stage. For example, the Build stage (220) is shown with four optional tools (222), (224), (226), and (228), the Unit Test stage (230) is shown with two optional tools (232) and (234), the Deploy Development stage (240) is shown with two optional tool (242) and (244), the Integration Tests stage (250) is shown with three optional tools (252), (254), and (256), the Compliance Checks stage (260) is shown with two optional tools (262) and (264), and the Deploy Product stage (270) is shown with tool (272). The template, stages, and tools are an example of the pipeline template and should not be considered limiting. In one embodiment, the Push to Runtime tool (272) in the Deploy Product stage (270) functions to organize the selected tools represented in the pipeline stages into executable program code. Accordingly, the pipeline template is a platform that encapsulates a model for program code development, with the model referred to herein as a pipeline.

The source manager (152) functions as an interface to identify intent(s) and corresponding action(s) to be captured, and in one embodiment reflected, in the template for program code development. As shown herein, a cognitive assessment tool (154), also referred to herein as a cognitive manager, is shown operatively coupled to the source manager (152). The cognitive assessment tool (154) functions to refine the intents that are searched by the source manager (152). More specifically, through the refinement action(s) of the cognitive assessment tool (154), one or more pipeline tools that match the searched and refined intents are identified. Accordingly, the source manager (152) and the cognitive assessment tool (154) function to identify and refine, respectively, intents and to effectively translate the refined intent(s) to a corresponding pipeline tool.

As further shown, the AI platform (150) is provided with a pipeline manager (156) to address the composition of a corresponding pipeline template. See FIG. 2 for an example pipeline template. The pipeline manager (156) functions to support and execute dynamic modification of the pipeline template. By interfacing with the cognitive assessment tool (154), the pipeline manager (156) identifies an appropriate stage of the pipeline template and integrates the identified matched pipeline tool(s) into the identified pipeline stage. This dynamic integration facilitates creation of program code as output (170), with the program code being aligned with and/or corresponding to the dynamically modified pipeline template. Accordingly, the tools (152)-(158) function separately and together to dynamically modify the pipeline template, identify and integrate one or more tools into the template, effectively generating program code that corresponds to the modified pipeline template.

An aspect of the intent refinement by the cognitive assessment tool (154) is directed at natural language processing (NLP). As shown herein, a dialogue manager (158) is shown operatively coupled to the cognitive assessment tool (154). The dialogue manager (158) functions to search and/or monitor communication mediums, including but not limited to, text-based communications, and oral communications. In one embodiment, the dialogue manager (158) is a chatbot. It is understood in the art that the chatbot is a computer program that uses AI to support a conversation with a human. Questions and requests may be presented to the chatbot, and processing yields responses in the form of statements using NLP. Different mediums are supported by the chatbot, including but not limited to text and/or audio. In one embodiment, the chatbot is referred to as a virtual assistant. The dialogue manager (158) functions herein as a tool to map one or more of the identified intents into one or more corresponding actions. In one embodiment, the dialogue manager (158) detects and/or reviews communication mediums and translates corresponding communications to descriptive content that is then selectively mapped to create a relationship between the identified intent(s) and the pipeline template. In one embodiment, the cognitive assessment tool utilizes a domain model (166), shown herein embedded in the knowledge base (160), that maps one or more actions to one or more keywords, either a one-on-one mapping or a one-to-many mapping. Although shown local to the knowledge base (160), in one embodiment, the domain model may be embedded within the artificial intelligence platform (150). Accordingly, the NLP functionality of the dialogue manager (158) identifies one or more key terms in the detected and/or reviewed communication mediums, and matches the identified key term(s) with at least one stage of the pipeline, and more specifically, the pipeline template.

As shown and described in FIG. 2, the pipeline template is comprised of stages, with each stage having one or more executable tools to support the functionality of the respective stage. After the dialogue manager (158) creates the relationship between the identified intent, the key word(s), and the stage of the pipeline template, the cognitive assessment tool (154) addresses any amendments to the pipeline template. As described herein, each pipeline stage may be supported by one or more tools. The cognitive assessment tool (154) addresses whether the pipeline tools represented in the template should be changed, e.g. re-assigned to a different pipeline stage as represented in the template. In one embodiment, the cognitive assessment tool activates an identified tool in a pipeline stage, de-activates a previously activated tool in the pipeline stage, or in one embodiment, assigns an additional tool to a select pipeline stage and activates the additional tool subsequent to the assignment. This activation/de-activation includes a dynamic modification of the corresponding program code (170) by the cognitive assessment tool (154).

As shown and described herein, the cognitive assessment tool (154) conducts both a forward and reverse evaluation of the tools represented in the pipeline template. The forward evaluation is directed at key word identification and NLP processing to further define pipeline stages and corresponding tools. The reverse evaluation is directed at the cognitive assessment tool (154) evaluating the tools represented in the pipeline template for quality control. This evaluation includes a behavioral assessment of the tools represented in the pipeline template, including the pipeline stages and corresponding tools, to ensure that the generated program code aligns to the evaluated behavior. If it is determined that there is a misalignment between the program code and the intended pipeline behavior, the cognitive assessment tool (154) may selectively and dynamically amend the pipeline template stages and one or more of the corresponding tools represented in the pipeline stages, and re-generate the corresponding code based on the selective and dynamic selection of tools. The selection of tools in each pipeline stage affects the functionality of the generated program code. Accordingly, the cognitive assessment tool (154) is configured to maintain quality control of the pipeline and the corresponding functionality as represented by the stages and tool assignment and selection, and more specifically, the selectively amend the tool activation and de-activation in the corresponding pipeline stages.

The source manager (152) is employed to detect and observe a source feed, and more specifically to identify an intent within the feed, if present. The intent is a characteristic corresponding to a goal or business objective of the data mining. The dialogue manager (158) utilizes NLP, within a communication or corresponding communication interface, to further define the identified intent(s). In one embodiment, the communication is on-going, and the dialogue manager (158) functions in real-time to detect and observe the communication. For example, in one embodiment, the dialogue manager (158) observes communication channels to ascertain if there is an on-going communication, e.g. live text-based communication. In one embodiment, the dialogue manager (158) functions as a background tool or process for the electronic communication detection and observation. Similarly, in one embodiment, the dialogue manager (158) opens or creates a dialogue channel, e.g. chatbot, as a communication medium to dynamically engage and create a dialogue to further define one or more intent characteristics that may be applied to the pipeline template, stages, tools, and corresponding actions.

The dialogue manager (158) can use a variety of protocols to parse communications within the dialogue channel, including identify content within the detected communication based on the relation between signifiers, such as words, phrases, signs, and symbols, and what they stand for, their denotations, or connotation. The dialogue manager (158) is shown herein as a tool embedded within the artificial intelligence platform (150) and operatively coupled to the cognitive assessment tool (154). The dialogue manager (158) utilizes natural language processing (NLP) protocols to interpret an expression and an associated intent with the electronic communication. In one embodiment, the dialogue manager (158) converts the electronic communication to well-formed content, e.g. natural language text, so that the content may be interpreted, and the pipeline manager (156) may dynamically modify the pipeline with an appropriate and corresponding tool embedded in an appropriate and accurately identified pipeline stage. Accordingly, the tools (152)-(158) function to dynamically observe and engage in an electronic communication interface, and apply the dynamic engagement to a corresponding and dynamic amendment to the pipeline stage(s) and tool(s).

The source feed transmitted across the network connection (102) may be processed by the server (110), and the corresponding artificial intelligence platform (150). As shown herein, the source manager (152) performs an analysis on the source feed received as the input content (102) using a variety of reasoning algorithms. There may be hundreds or even thousands of reasoning algorithms applied, each of which performs different analysis, e.g., comparisons. For example, some reasoning algorithms may look at matching of terms and synonyms within the language of the input content (102) and the found portions of the corpus of data to identify presence of intents within the input content (102). The dialog manager (158) functions as a communication engagement interface, and in one embodiment, processes the electronic communication into word vector representations to identify and extract features within the dialogue communication. Whether through use of word vector representations, or an alternative platform for processing electronic communication, the dialogue manager (158) processes the electronic communication in an effort to identify presence of an interrogatory, e.g. interrogatory, and other characteristic data present within the dialogue. In one embodiment, the platform identifies grammatical components, such as nouns, verbs, adjectives, punctuation, punctuation marks, etc. in the electronic communication. Similarly, in one embodiment, one or more reasoning algorithms may look at temporal or spatial features in language of the electronic communication. Accordingly, the cognitive assessment tool (154) and the dialogue manager (158) observe the electronic communication and conduct appropriately designated assessments to identify and analyze intents, respectively.

In some illustrative embodiments, server (110) may be the IBM Watson® system available from International Business Machines Corporation of Armonk, N.Y., which is augmented with the mechanisms of the illustrative embodiments described hereafter. The IBM Watson® system may receive the detected source feed as electronic communication input content (102) which it then analyzes to identify presence of intents within the content (102) that in turn are applied to the corpus of data (160). Based on application of the identified intent from the source feed (102) to the corpus of data (160), a set of candidate actions are generated by looking across the corpus of data (160) for portions of the corpus of data (160) that have some potential for containing a response matching or corresponding to an intent of the identified content characteristic(s) of the content (102).

Once the intent(s) is ascertained and identified within the input content (102), the dialogue manager (158) is selectively engaged to further define or refine intent characteristics so that a corresponding action may be identified and dynamically applied to the pipeline template. The dialogue manager (158) resolves the intent(s). More specifically, the dialogue manager (158) initiates or engages a chatbot and applies natural language processing (NLP) to corresponding chatbot communication(s). The dialogue manager (158) utilizes the parsed components of the communication to identify an action corresponding to the intent(s), and interfaces with the cognitive assessment tool (154) to identify a pipeline tool corresponding to the action. The intent correlates to a meaning, purpose, and/or goal expressed in the source feed and the communication. Before the communication(s) can be resolved with an action and corresponding tool, it is understood that the intent must be identified and resolved. In one embodiment, the intent may be the subject of the communication. NLP is the science of extracting the intention of text and relevant information from text. In one embodiment, words or phrases present in the communication provide clarification or context to the intent. Accordingly, the dialogue manager (158) evaluates context associated with the communication and the communication interface to understand and define the intent.

It is understood that the goal of the intent management and analysis is not merely to provide a response in the form of the pipeline stage to which the intent is directed, but to correlate the intention with a physical action and to identify a tool that supports the physical action, and to dynamically integrate the identified tools into the pipeline template. It is understood that in one embodiment, the dialogue manager (158) may identify a plurality of viable actions, hereinafter referred to as candidate actions, and further functions to resolve and narrow the pool of candidate actions. In one embodiment, the dialogue manager (158) may create an interrogatory to further define or refine the subject of the identified interrogatory, and present the created interrogatory to the electronic communication interface to engage with the communication exchange. In another embodiment, the dialogue manager (158) identifies relevant candidate actions for pipeline amendment, applies a confidence or relevance score to each identified candidate action, conducts a ranking of the candidate actions based on the applied confidence score, and selects at least one of the candidate actions based on the ranking. Accordingly, the dialogue manager (158) functions to identify, and in one embodiment, resolve, the intent and corresponding action(s).

The source manager (152), cognitive assessment tool (154), pipeline manager (156), and dialogue manager (158), hereinafter referred to collectively as AI tools, are shown as being embodied in or integrated within the artificial intelligence platform (150) of the server (110). The AI tools may be implemented in a separate computing system (e.g., 190) that is connected across network (105) to the server (110). Wherever embodied, the AI tools function to identify an intent with respect to a pipeline template and corresponding pipeline action and tool, dynamically modify the pipeline template, and generate program code aligned with the modified pipeline template.

In selected example embodiments, the dialogue manager (158) may use a Slot Grammar Logic (SGL) parser to perform communication parsing and evaluation. The dialogue manager (158) may also be configured to apply one or more learning methods to match detected intent to known interrogatories or patterns of interrogatories to decide and categorize the corresponding intent of the interrogatory.

Types of information handling systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190*a*), and mainframe computer (182) utilizes nonvolatile data store (182*a*). The nonvolatile data store (182*a*) can be a component that is external to the various information handling systems or can be internal to one of the information handling systems.

The information handling system employed to support the artificial intelligence platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, the information handling system may embody the north bridge/south bridge controller architecture, although it will be appreciated that other architectures may also be employed.

Figure 3:
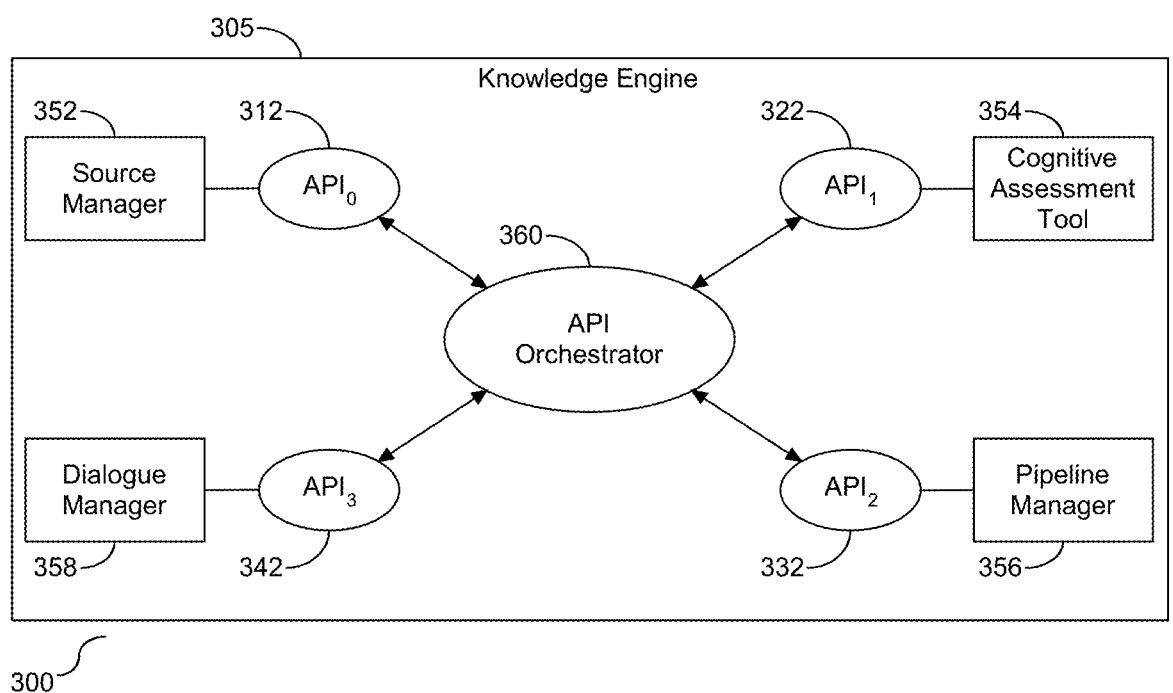
FIG. 3 depicts a block diagram illustrating the natural language processing tools, as shown and described in FIG. 1, and their associated application program interfaces (APIs).

An Application Program Interface (API) is understood in the art as a software intermediary between two or more applications. With respect to the artificial intelligence platform (150) shown and described in FIG. 1, one or more APIs may be utilized to support one or more of the tools (152)-(158) and their associated functionality. Referring to FIG. 3, a block diagram (300) is provided illustrating the tools (152)-(158) and their associated APIs. As shown, a plurality of tools are embedded within the artificial intelligence platform (305), with the tools including the source manager (352) associated with $API_0$ (312), the cognitive assessment tool (354) associated with $API_1$ (322), the pipeline manager (356) associated with $API_2$ (332), and the dialogue manager (358) associated with $API_3$ (342). Each of the APIs may be implemented in one or more languages and interface specifications. $API_0$ (312) provides functional support to search a source feed for one or more intents; $API_1$ (322) provides functional support to refine the intent(s) and match the refined intent(s) to one or more pipeline tools; $API_2$ (332) provides functional support to dynamically modify the pipeline template and corresponding program code; and $API_3$ (342) provides functional support to create and/or utilize a communication medium and utilize NLP to further define the refine intent(s) with respect to the pipeline template. As shown, each of the APIs (312), (322), (332), and (342) are operatively coupled to an API orchestrator (360), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 4:
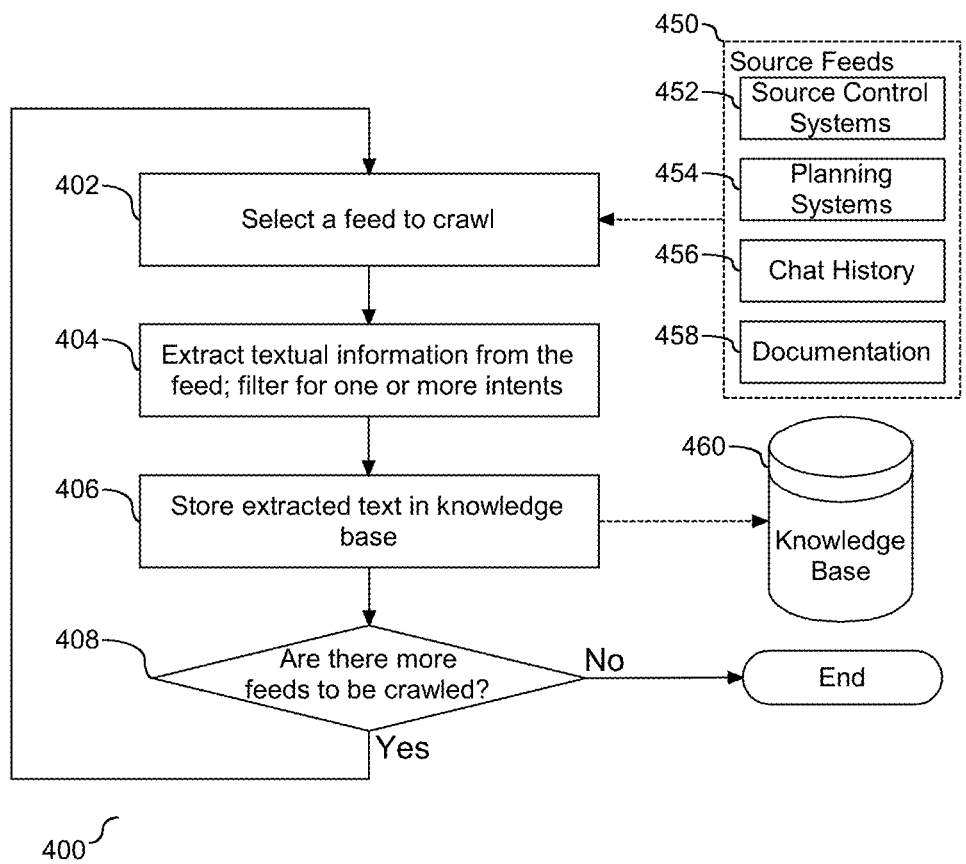
FIG. 4 depicts a flow diagram illustrating mining data from one or more source feeds.

Referring to FIG. 4, a flow diagram (400) is provided illustrating searching data from one or more source feeds, which is supported by the source manager (152). As shown, a source feed is selected to crawl for data (402). As shown at (450), the source feed, such as source feed (102) or an alternative input source across the network (105), is comprised of source control systems (452), planning systems (454), chat history (456), and documentation (458). The source control system(s) is directed at the location of the source code. The planning system(s) (454) is directed at the location of the user stories for the software development. It is understood in the art that the user stories describe an aspect of system functionality or the desired system functionality, and in one embodiment the user stories may be in text form. The chat history (456) is the communication(s) among the developers of the software. The documentation (458) is the written document or file about the software code, specification(s) of the goal(s) of the software code, including functional and non-functional requirements. The source feed selected at step (402) includes all four fields (452)-(458) to be explored and searched.

Following the source feed selection at step (402), textual information is extracted from the feed (404) and stored in a corresponding knowledge base (406), shown herein as knowledge base (460). In one embodiment, the extraction at step (404) is a filter of textual data for one or more intents corresponding to a goal or business objective of the data searching. Following step (406) it is determined if there are any more feeds to be crawled (408). It is understood that in one embodiment, the quantity of feeds may be limited by topic or range. For example, in one embodiment, the quantity of feeds determined to be relevant to the data crawl may be ascertained prior to the crawling. A positive response to the determination at step (408) is followed by a return to step (402) for selection or identification of a feed to be crawled. Similarly, a negative response to the determination at step (408) concludes the feed crawling and associated text identification and extraction process. As shown, the crawling process keeps searching source feeds until there is no new data to be searched, with all of the searched data from the source feed(s) stored in the knowledge base (460) that in one embodiment may be used by other system components and/or tools. Accordingly, one or more source feeds are identified and selected, and subsequently crawled to extract textual information in the form of intents.

Figure 5A:
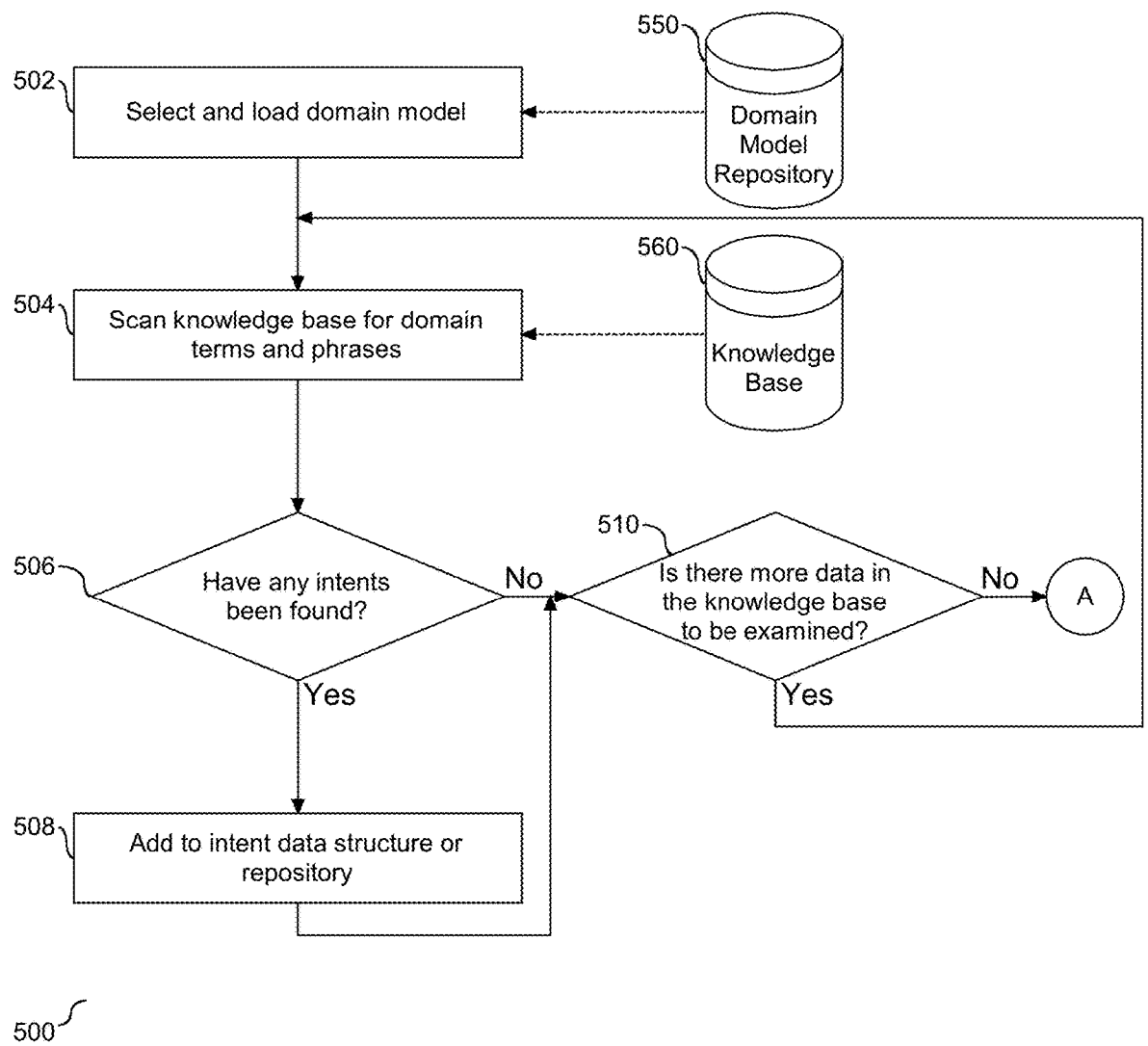
FIGS. 5A and 5B together depict a flow chart illustrating a process for analyzing the intents searched in the source feed crawling process shown and described in FIG. 4.
Figure 5B:
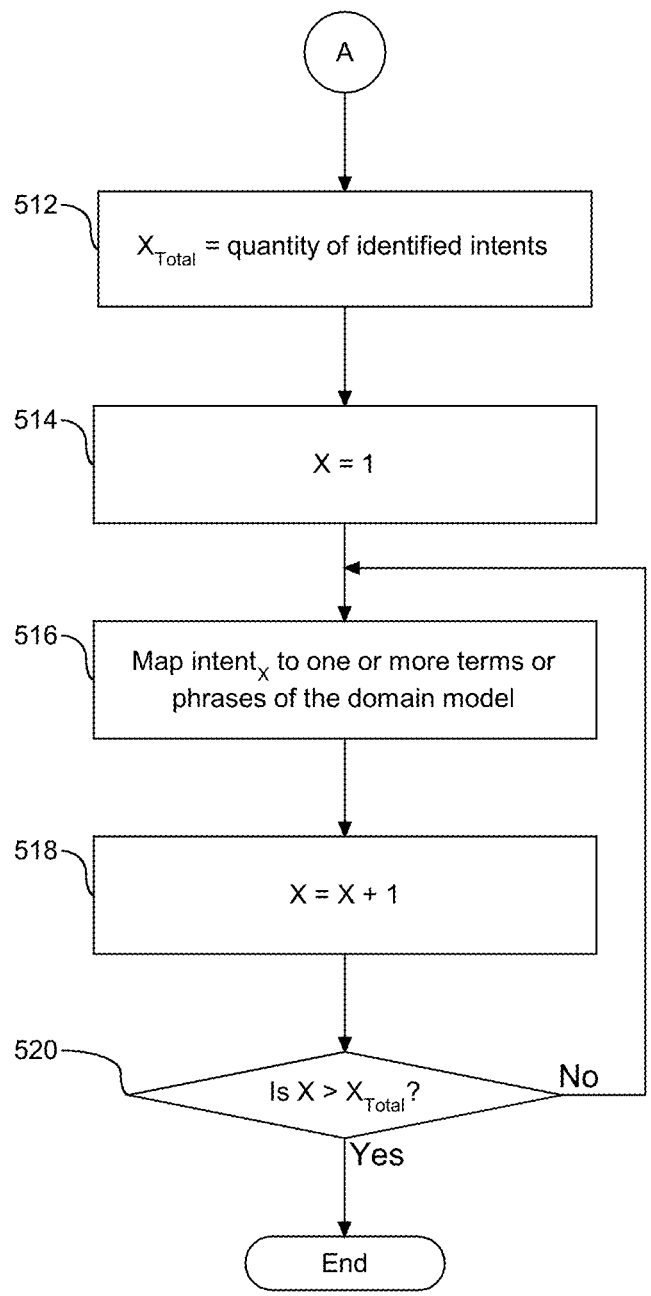

Referring to FIGS. 5A and 5B, a flow chart (500) is provided illustrating a process for analyzing the intents searched in the source feed crawling process shown and described in FIG. 4, and is supported by the source manager (152). A domain model is a framework to describe and model real world entities and corresponding relationships. Examples of domain models include, but are not limited to, banking, insurance, manufacturing, etc. It is understood that different industries may have different objectives, and as such different domain models. Each domain model consists of terms and phrases used in a given domain and tags the terms and phrases within an intent. A word or phrase may be defined or otherwise identified as an intent in one domain, but not in a different domain. The process of analyzing the searched intent(s) is initiated with selecting and loading of a domain model (502). In one embodiment, and as shown herein, the domain model may be selected from a repository of domain models (550). The domain models consist of terms and phrases used in a given domain, and tags the terms and phrases with a corresponding intent. Using the selected or identified domain model, the knowledge base (560) populated with searched intents, as shown and described in FIG. 4, is scanned for domain terms and phrases (504). It is determined if any intents specific to the selected and loaded domain model have been found in the scanning of the knowledge base (506). A positive response to the determination at step (506) is followed by adding each such found intent to a data structure or repository (508). A negative response to the determination at step (506) is followed by determining if there is more data in the knowledge base to be examined (510). If the response at step (510) is positive, the process returns to step (504) to scan for domain terms and phrases until all the knowledge data has been examined for intents specific to one or more particular domain models. Similarly, if the response at step (510) is negative this is an indication that the knowledge base scan is completed. Accordingly, an appropriate domain model is selected and one or more corresponding knowledge bases of searched data are reviewed to identify intents for the selected domain model.

It is understood that each domain model consists of terms and phrases. The intents identified in the knowledge base at step (506) may apply to one or more of the terms and phrases. The variable $X_{Total}$ is assigned to the quantity of identified intents (512) and an associated intent counting variable, X, is initialized (514). Each searched intent, intent$_X$, is mapped to one or more of the terms or phrases of the domain model (516). Following the mapping at step (516), the intent counting variable is incremented (518), and it is determined if each of the intents has been subject to the term or phrase mapping (520). A negative response to the determination at step (520) is followed by a return to step (516), and a positive response concludes the mapping process. Accordingly, as shown herein, each searched intent is mapped to a term or phrase for the selected domain model.

Figure 6:
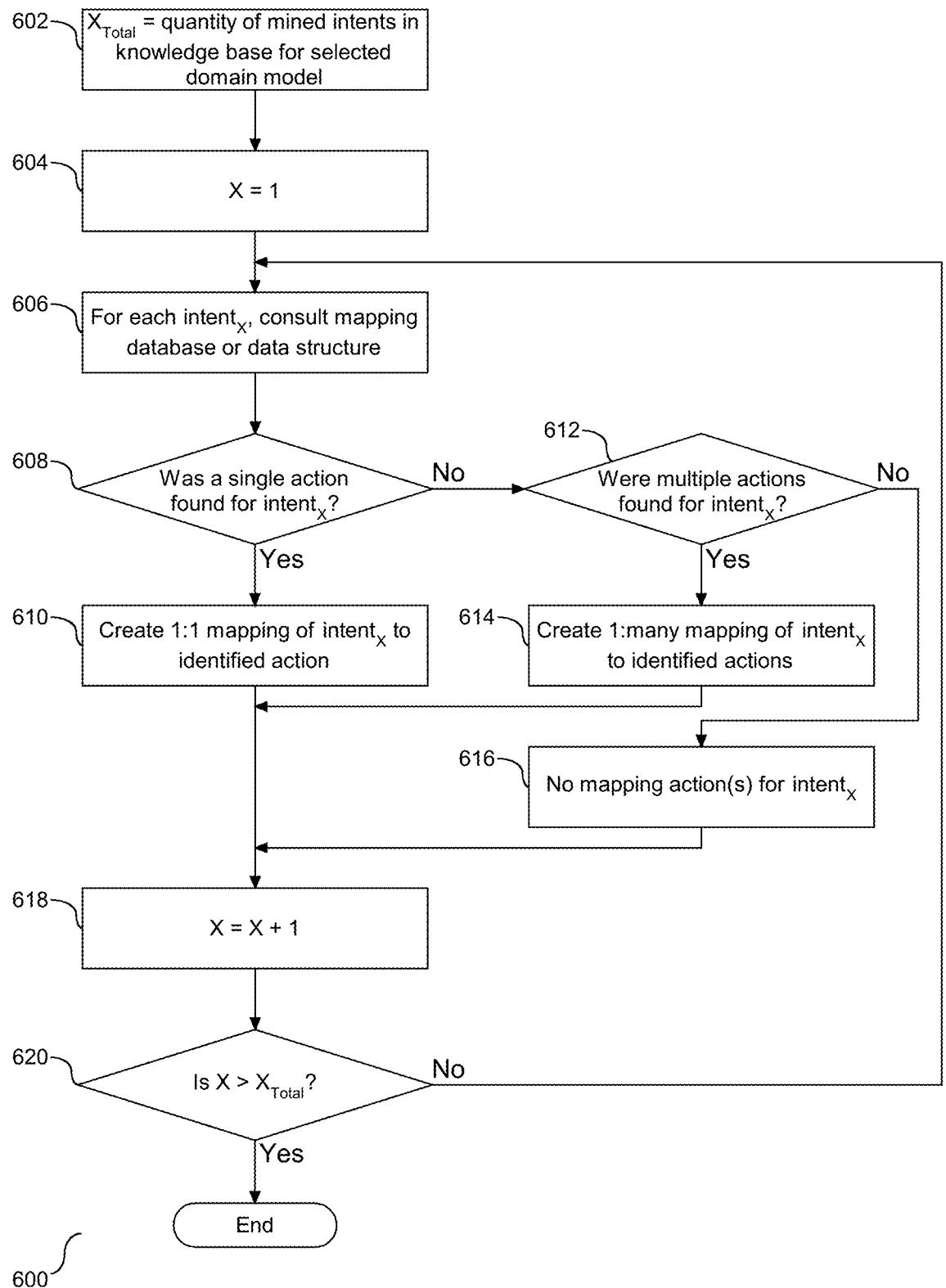
FIG. 6 depicts a flow chart illustrating a process of mapping intents to actions.

It is understood in the art that the searched intents are subject to alignment with an action for the selected domain. Referring to FIG. 6, a flow chart (600) is provided illustrating a process of mapping intents to actions, as supported by the source manager (152). The variable $X_{Total}$ represents the intents found in the knowledge base for the selected domain model (602). An intent counting variable is initialized (604). For each intent$_X$, a mapping database or data structure of intents to action is consulted to search for a matching action (606). In one embodiment, the action is an executable element by a corresponding pipeline template. It is determined if a single matching action was found for intent$_X$ (608). A positive response to the determination at step (608) is followed by creating a mapping of intent$_X$ to the matching action (610). However, a negative response to the determination at step (608) is followed by determining if multiple actions were found for intent$_X$ (612). A positive response to the determination at step (612) is followed by creating a mapping of intent$_X$ to each of the identified actions (614). A negative response to the determination at step (612) is an indication that there is no action intended to be mapped to intent$_X$ (616). Following the mapping assignment(s) created at steps (610) or (614), or following step (616), the intent counting variable is incremented (618). It is then determined if each of the intents found in the knowledge base for the selected domain has been reviewed for a matching or corresponding action (620). A negative response to the determination step (620) is followed by a return to step (606) to continue the action identification and matching process. However, a positive response to the determination at step (620) concludes the action assessment and matching process. Accordingly, the mapping database or data structure of intents to actions is consulted to identify an appropriate action or actions for the identified intents and to align the intent(s) with a function for the specified domain.

Figure 7:
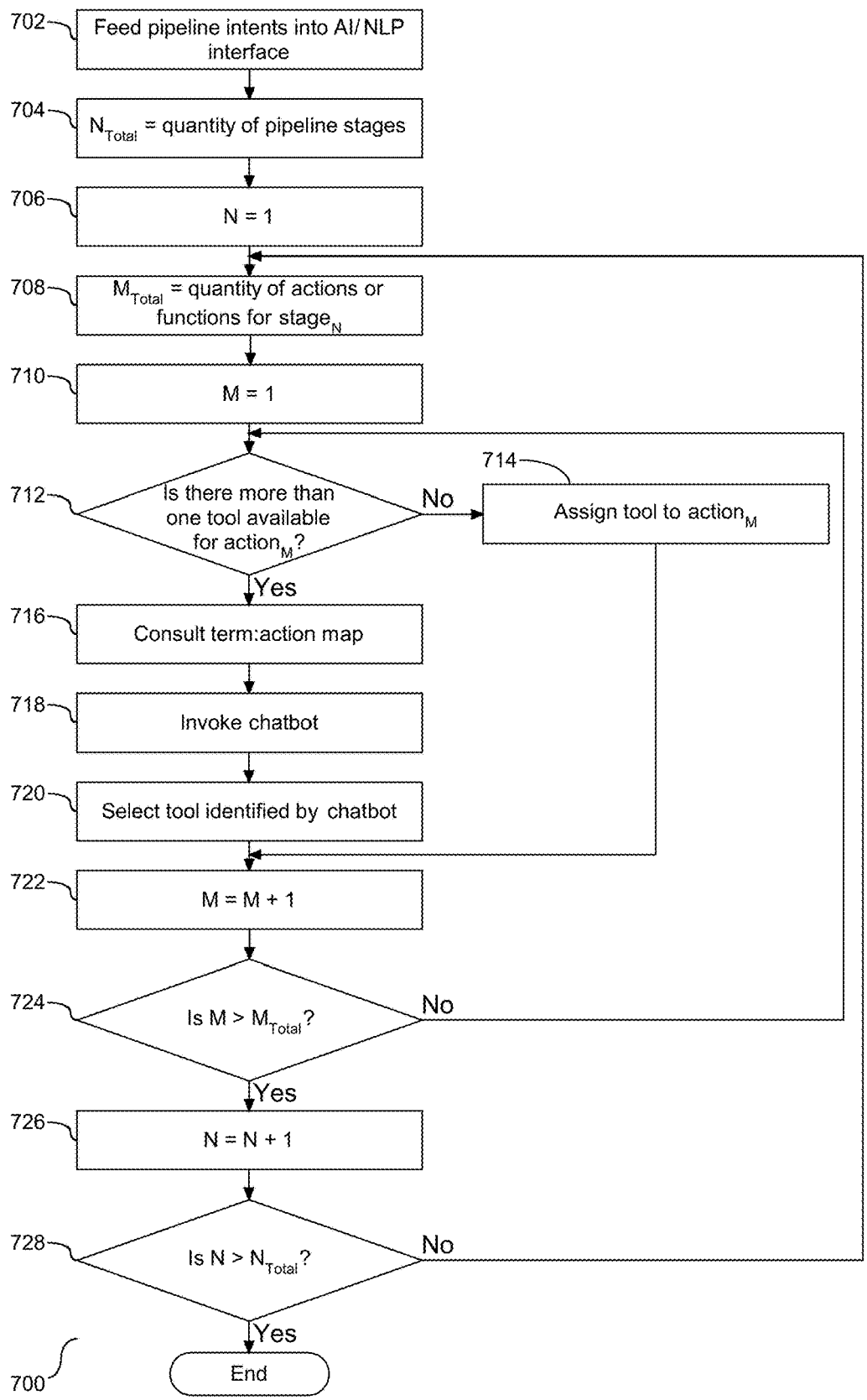
FIG. 7 depicts a flow chart illustrating a process for leveraging AI and NLP to clarify available options with respect to pipeline refinements.

The processes shown and described in FIGS. 4-6 are directed at utilizing the intents and associated actions to dynamically modify the pipeline template and corresponding functionality as represented by the populated actions. It is understood that each stage of the pipeline may have a plurality of options, and guidance may be beneficial, if not necessary, to properly and accurately refine the pipeline. Referring to FIG. 7, a flow chart (700) is provided to illustrate a process for leveraging AI and NLP to clarify available options with respect to pipeline refinements. As shown and described in FIG. 1, the AI and NLP functionality is supported by the cognitive assessment tool (154). It is understood in the art that the pipelines is a set of processes. As articulated herein, the pipeline is comprised to two or more stages, with each stage having one or more actions or action items. The pipeline intents are fed into an AI/NLP software interface (702), such as a chatbot. It is understood in the art that the chatbot is a computer program that uses AI to support a conversation with a human. Questions and requests may be presented to the chatbot, and processing yields responses in the form of statements using NL. Different mediums are supported by the chatbot, including but not limited to text and/or audio. In one embodiment, the chatbot is referred to as a virtual assistant. Accordingly, by feeding the pipeline intents into the chatbot, a foundation for the refinement is provided.

It is understood that the pipeline is comprised of a plurality of stages. The quantity of stages is assigned to the variable $N_{Total}$ (704), and an associated stage counting variable is initialized (706). It is further understood that each stage may be defined by one or more actions or functions. For stage$_N$, the quantity of actions or functions, hereinafter referred to as actions, are identified and assigned to the variable $M_{Total}$ (708). An associated action counting variable M is initialized (710). It is then determined if there is more than one tool available for action$_M$ (712). A negative response to the determination at step (712) is followed by assigning the tool to action$_M$ (714). However, a positive response at step (714) is followed by consulting a term to action map (716), and invoking the chatbot, e.g. dialogue manager (158), to further define the characteristics and goals of action$_M$ (718). As shown and described in FIG. 1, the dialogue manager (158) detects and/or reviews communication mediums and translates corresponding communications to descriptive content that is then selectively mapped to create a relationship between the identified intent(s) and the pipeline template. In one embodiment, the dialogue manager (158), e.g. chatbot, is dynamically activated in response to one or more communications received in a corresponding communication medium. The chatbot may be invoked to gather information regarding the characteristics, goals, and compatibility concerns with action$_M$. Using the information gathered by the chatbot at step (718), a tool for action$_M$ is selected or otherwise identified (720). Accordingly, for each stage, the action(s) is identified and a tool corresponding to the goal(s) and/or characteristic(s) of the action is selected.

Following either of steps (714) or (720), the action counting variable M is incremented (722), and it is determined if each of the actions for pipeline stage$_N$ has been assessed (724). A negative response to the determination at step (724) is following by a return to step (712), and a positive response is followed by an increment of the pipeline stage counting variable, N, (726). It is then determined if each of the pipeline stages has been assessed and a tool appropriately selected or designated (728). A negative response to the determination at step (726) is followed by a return to step (708), and a positive response concludes the pipeline assessment and tool selection process. Accordingly, for each pipeline stage, actions are identified, and a chatbot is selectively invoked for selection of a tool to support the action defined within the stage(s).

Figure 8:
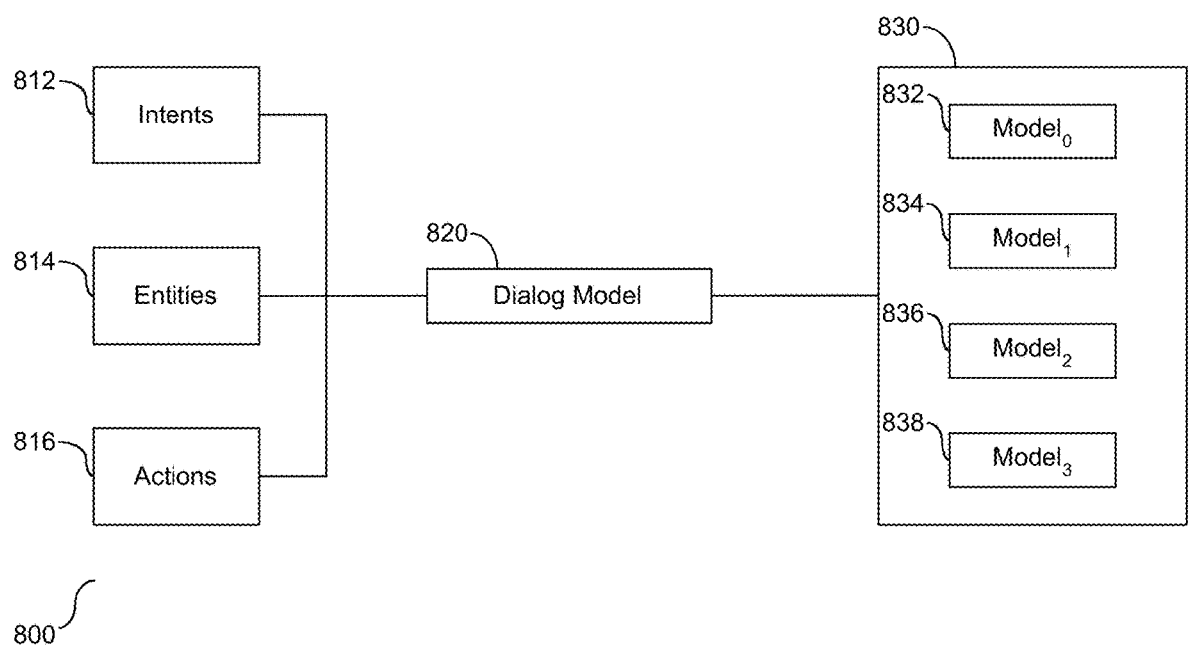
FIG. 8 depicts a flow diagram illustrating implementation of the chatbot with respect to the pipeline stages and actions.

Referring to FIG. 8, a flow diagram (800) is provided to illustrate implementation of the chatbot with respect to the pipeline stages and actions. The chatbot is shown herein at (820) as a dialog model. The chatbot utilizes NLP process to assess and identify intent (812), entities (814), and action(s) (816) for one or more stages of the pipeline. In this example, the chatbot is being utilized to assess characteristics and requirements for a particular pipeline stage. There are four types of program modules (830) that are available for the pipeline stage subject to assessment, including module$_0$ (832), module$_1$ (834), module$_2$ (836), and module$_3$ (838). The module that matches the outcome from the assessment is selected for the pipeline stage. Accordingly, the dialog model (820) functions to finalize the intent and associated characteristics to select an appropriate module from an array of available modules.

Figure 9:
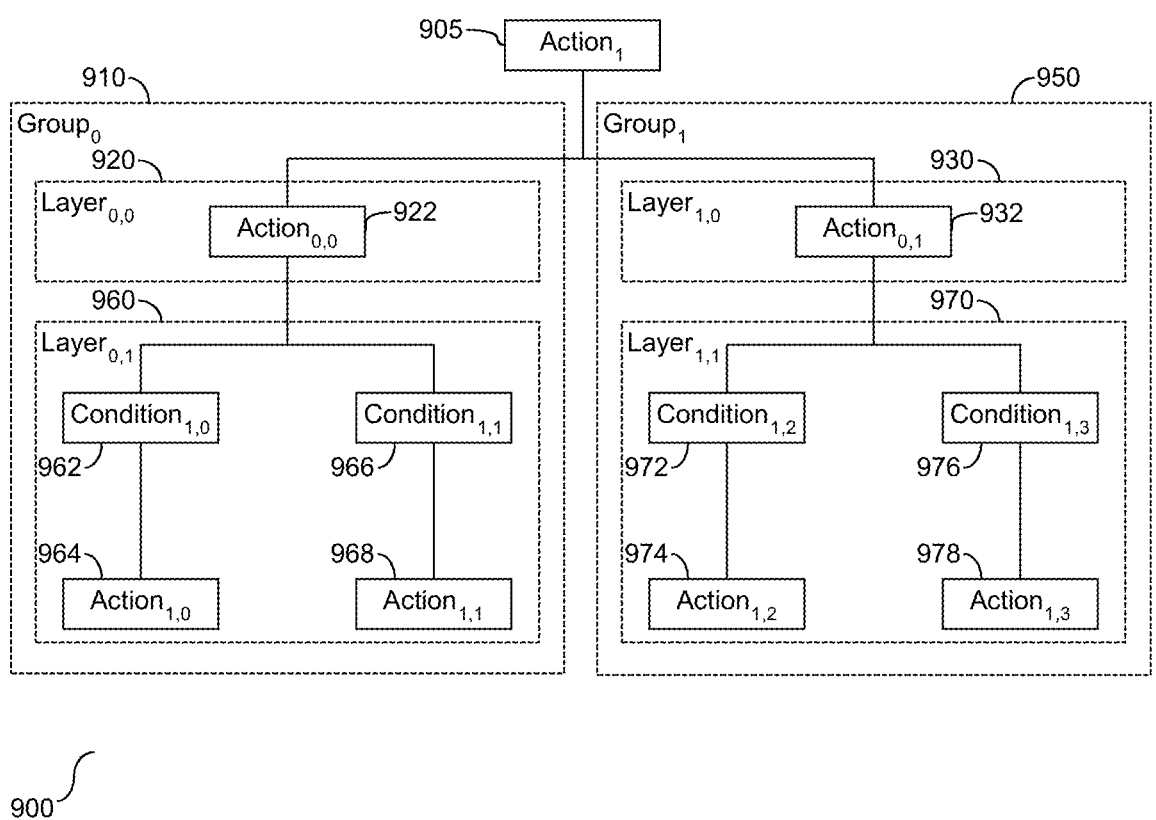
FIG. 9 depicts a block diagram to illustrate a hierarchical map of a complex action plan.

It is understood that an action in the pipeline may be complex, and as such comprised of pre-conditions and post-conditions. Referring to FIG. 9, a block diagram (900) is provided to illustrate a hierarchical map of a complex action plan. As shown and described, the hierarchy is an inverted tree structure in which a plurality of actions are grouped in the layering for pipeline refinement. As shown in this example, the hierarchy is shown with a root action, $action_1$ (905), also referred to herein as a root node, and two groupings (910) and (950), referred to herein as a first grouping and a second grouping, $Group_0$ and $Group_1$, respectively. Each of the groupings is shown with multiple layers, e.g. two layers, although the quantity of layers should not be considered limiting. The first grouping, $group_0$ (910) is shown with $Layer_{0,0}$ (920) and $Layer_{0,1}$ (960), and $Group_1$ (950) is shown with $Layer_{1,0}$ (930) and $Layer_{1,1}$ (970). The first layer in each group is shown with one action. As shown, $Layer_{0,0}$ (920) is shown with one action represented as $Action_{0,0}$ (922), and $Layer_{0,1}$ (930) is shown with one action represented as $Action_{0,1}$ (932). The second layer in each group is shown with conditions and corresponding actions. As shown, $Layer_{0,1}$ (960) is shown with $Condition_{1,0}$ (962) mapped to $Action_{1,0}$ (964) and $Condition_{1,1}$ (966) mapped to $Action_{1,1}$ (968), and $Layer_{1,1}$ (970) is shown with conditions and corresponding actions. As shown, $Condition_{1,2}$ (972) is mapped to $Action_{1,2}$ (974) and $Condition_{1,3}$ (976) is mapped to $Action_{1,3}$ (978). The hierarchy shown and the associated quantity and structure of nodes and associated items represented in the hierarchy is merely an example and should not be considered limiting. The hierarchy is directed at a structure to categorize actions and associated conditions, e.g. pre-conditions and post-conditions. As shown and described herein, actions may be classified or otherwise identified responsive to the hierarchical structure. Accordingly, the complex action plan is shown herein as a hierarchical structure with a presentation of actions against which conditions are processed.

Each action in the structure shown in FIG. 9 is associated with a tool to be implemented into the pipeline. In one embodiment, the individual actions, or the actions combined with the pre-condition and/or post-condition is directly associated with a tool to be implemented into the pipeline. Once the tool is identified, it is subject to being deployed in the pipeline. More specifically, the scripts and code associated with the tool are dynamically generated and embedded into the pipeline.

Figure 10A:
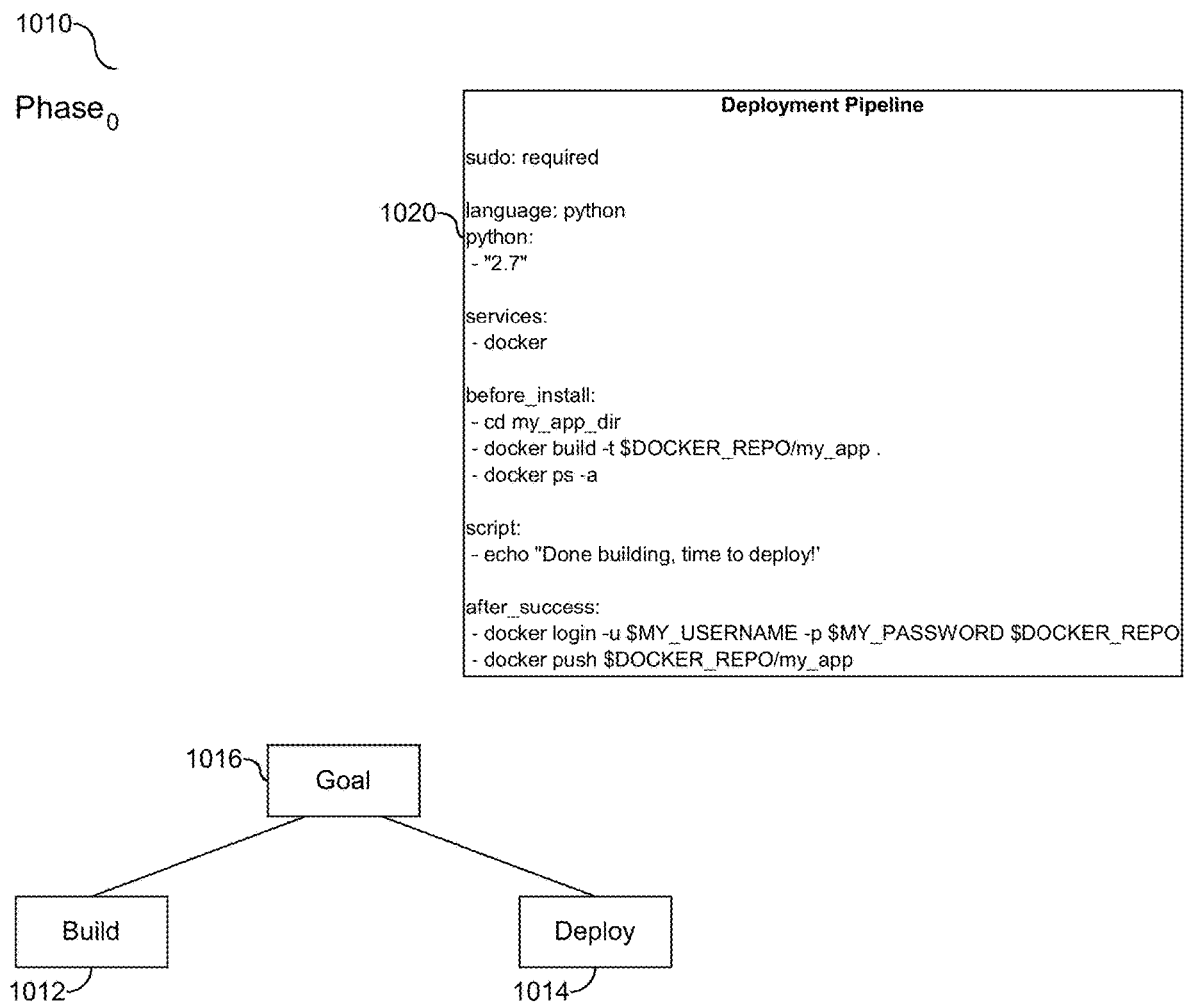
FIGS. 10A-10C together depict a multi-phase pipeline plan and associated program code development and deployment.
Figure 10B:
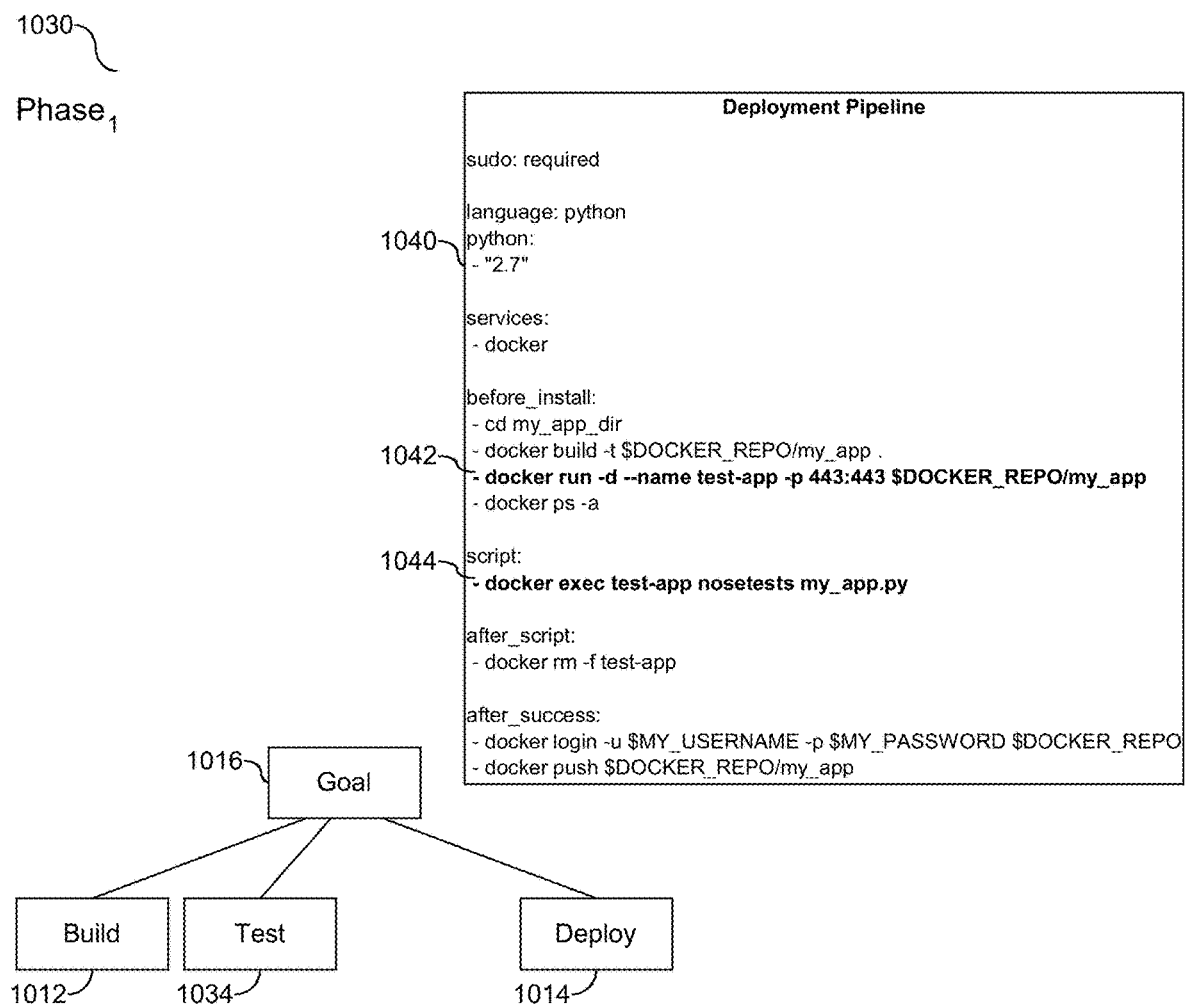
Figure 10C:
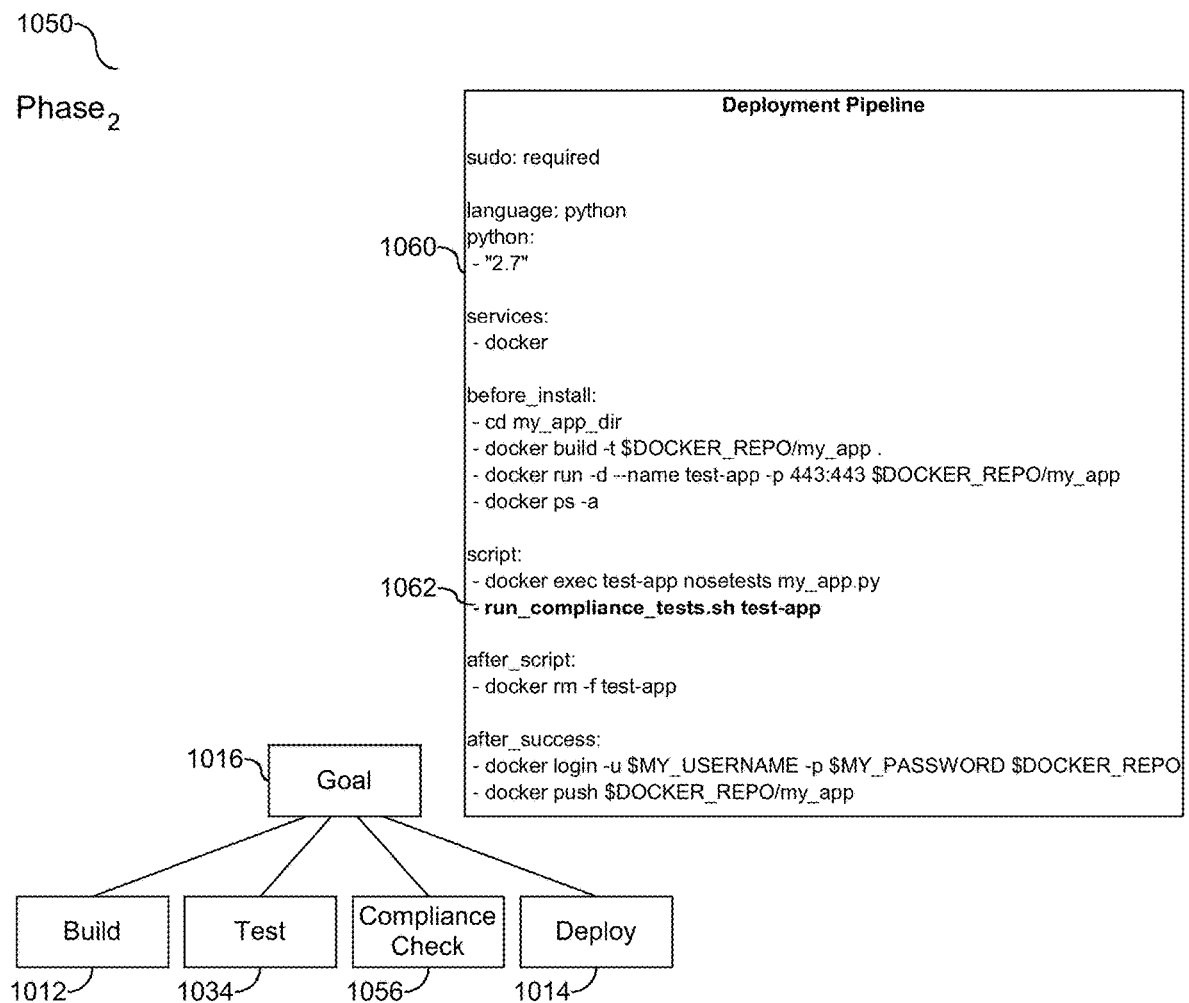

Referring to FIGS. 10A-10C, a series of diagrams are provided to illustrate a pipeline plan and associated program code. Three phases of the pipeline plan and code are shown. It is understood that the quantity of phases and associated program code deployment is merely for exemplary purposes and should not be considered limiting. A first phase of the pipeline, $Phase_0$ (1010) is shown in FIG. 10A with a goal (1016) and two sets of intents, shown herein as a Build intent (1012) and a Deploy intent (1014), and corresponding program code (1020). Referring to a second phase of the pipeline development, $Phase_1$ (1030) shown in FIG. 10B with the Goal (1016) an added intent of Test (1034) positioned between the Build intent (1012) and the Deploy intent (1014), and corresponding program code (1040). As shown, the program code includes instructions (1042) and (1044) corresponding to the added Test intent (1034). FIG. 10C refers to a third phase of the pipeline development, $Phase_2$ (1050) with the Goal (1016) an added intent of Compliance Check (1056) positioned between the intent for Test (1034) and the intent for Deploy (1014). In addition, the program code (1060) is shown with embedded instructions modified at (1062) to reflect the Compliance Check intent (1056). The program code and associated modifications illustrates program script and sequential placement of the scripts to reflect modifications to the pipeline. In one embodiment, if one or more intents are removed from the pipeline, the corresponding scripts are removed from the program code. Accordingly, as intents are identified, corresponding program code is amended to add or remove corresponding program scripts.

Embodiments shown and described herein may be in the form of a computer system for use with an intelligent computer platform for providing dynamic interrogatory identification and analysis for development of a corresponding contextual response, and in one embodiment, contextual response data. A processing unit is operatively coupled to memory and is in communication with an artificial intelligence platform. A tool, in communication with the processing unit, is activated by the artificial intelligence platform and employed to provide the interrogatory identification and analysis. As described herein, the interrogatory is identified from an electronic communication, and in one embodiment, a corresponding communication interface. The intent of the interrogatory is identified, whereby the meaning of the interrogatory correlates to a subject of the interrogatory.

Aspect of the pipeline application development and processing shown in FIGS. 1-10, employs one or more functional tools, as shown and described in FIG. 1. Aspects of the functional tools (152)-(158) and their associated functionality may be embodied in a computer system/server in a single location, or in one embodiment, may be configured in a cloud-based system sharing computing resources. With references to FIG. 11, a block diagram (1100) is provided illustrating an example of a computer system/server (1102), hereinafter referred to as a host (1102) in communication with a cloud-based support system, to implement the processes described above with respect to FIGS. 3-9. Host (1102) is operational with numerous other general purpose or special purpose computing system environments or configurations. Examples of well-known computing systems, environments, and/or configurations that may be suitable for use with host (1102) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (1102) may be described in the general context of computer system-executable instructions, such as program modules, being executed by a computer system. Generally, program modules may include routines, programs, objects, components, logic, data structures, and so on that perform particular tasks or implement particular abstract data types. Host (1102) may be practiced in distributed cloud computing environments (1110) where tasks are performed by remote processing devices that are linked through a communications network. In a distributed cloud computing environment, program modules may be located in both local and remote computer system storage media including memory storage devices.

Figure 11:
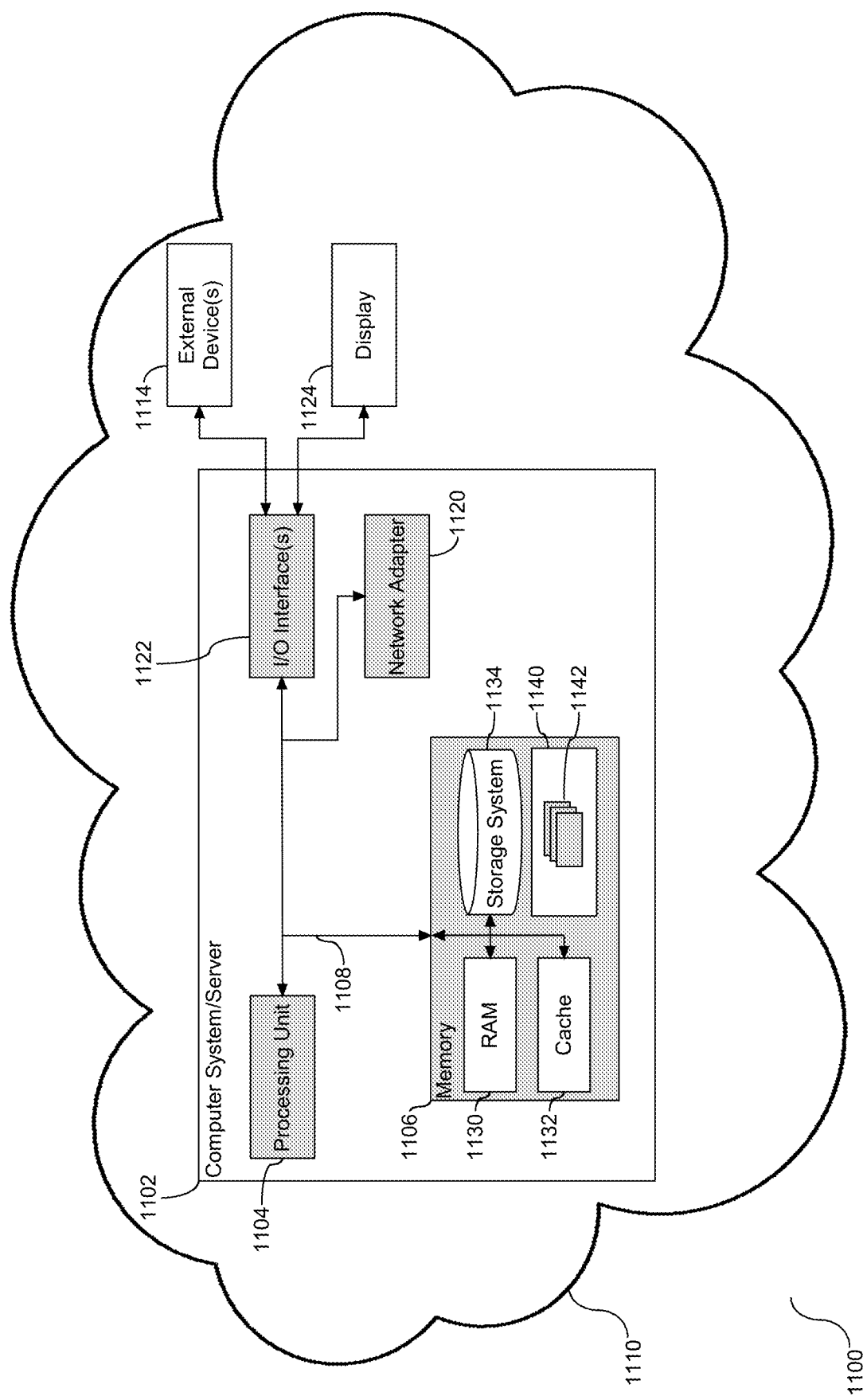
FIG. 11 depicts a block diagram illustrating an example of a computer system/server of a cloud based support system, to implement the system and processes described above with respect to FIGS. 1-10C.

As shown in FIG. 11, host (1102) is shown in the form of a general-purpose computing device. The components of host (1102) may include, but are not limited to, one or more processors or processing units (1104), e.g. hardware processors, a system memory (1106), and a bus (1108) that couples various system components including system memory (1106) to processor (1104). Bus (1108) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (1102) typically includes a variety of computer system readable media. Such media may be any available media that is accessible by host (1102) and it includes both volatile and non-volatile media, removable and non-removable media.

Memory (1106) can include computer system readable media in the form of volatile memory, such as random access memory (RAM) (1130) and/or cache memory (1132). By way of example only, storage system (1134) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (1108) by one or more data media interfaces.

Program/utility (1140), having a set (at least one) of program modules (1142), may be stored in memory (1106) by way of example, and not limitation, as well as an operating system, one or more application programs, other program modules, and program data. Each of the operating systems, one or more application programs, other program modules, and program data or some combination thereof, may include an implementation of a networking environment. Program modules (1142) generally carry out the functions and/or methodologies of embodiments to dynamically communication evaluation interrogatory identification and processing. For example, the set of program modules (1142) may include the tools (152)-(158) as described in FIG. 1.

Host (1102) may also communicate with one or more external devices (1114), such as a keyboard, a pointing device, etc.; a display (1124); one or more devices that enable a user to interact with host (1102); and/or any devices (e.g., network card, modem, etc.) that enable host (1102) to communicate with one or more other computing devices. Such communication can occur via Input/Output (I/O) interface(s) (1122). Still yet, host (1102) can communicate with one or more networks such as a local area network (LAN), a general wide area network (WAN), and/or a public network (e.g., the Internet) via network adapter (1120). As depicted, network adapter (1120) communicates with the other components of host (1102) via bus (1108). In one embodiment, a plurality of nodes of a distributed file system (not shown) is in communication with the host (1102) via the I/O interface (1122) or via the network adapter (1120). It should be understood that although not shown, other hardware and/or software components could be used in conjunction with host (1102). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (1106), including RAM (1130), cache (1132), and storage system (1134), such as a removable storage drive and a hard disk installed in a hard disk drive.

Computer programs (also called computer control logic) are stored in memory (1106). Computer programs may also be received via a communication interface, such as network adapter (1120). Such computer programs, when run, enable the computer system to perform the features of the present embodiments as discussed herein. In particular, the computer programs, when run, enable the processing unit (1104) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (1102) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 12:
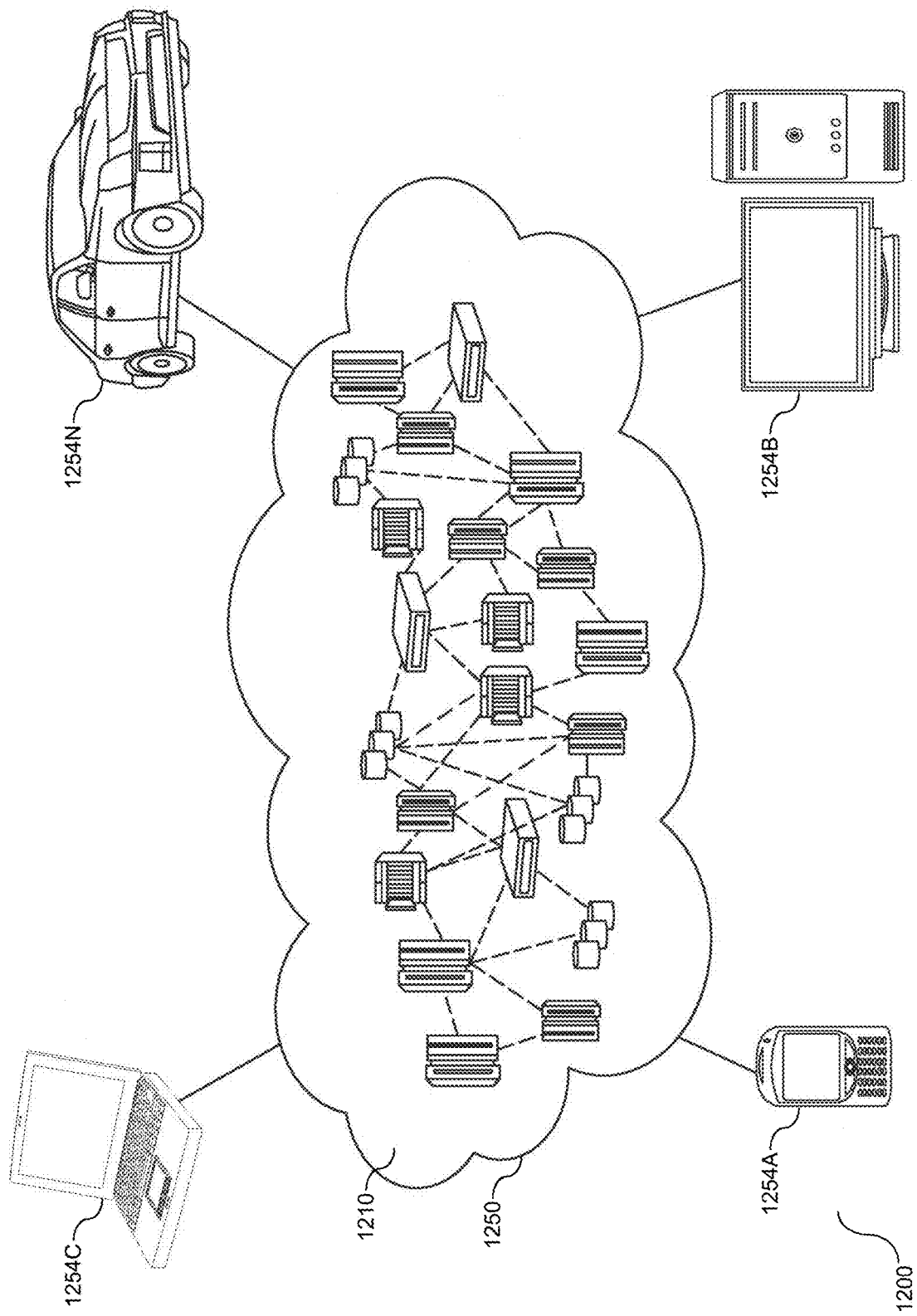
FIG. 12 depicts a block diagram illustrating a cloud computer environment.

Referring now to FIG. 12, an illustrative cloud computing network (1200). As shown, cloud computing network (1200) includes a cloud computing environment (1250) having one or more cloud computing nodes (1210) with which local computing devices used by cloud consumers may communicate. Examples of these local computing devices include, but are not limited to, personal digital assistant (PDA) or cellular telephone (1254A), desktop computer (1254B), laptop computer (1254C), and/or automobile computer system (1254N). Individual nodes within nodes (1210) may further communicate with one another. They may be grouped (not shown) physically or virtually, in one or more networks, such as Private, Community, Public, or Hybrid clouds as described hereinabove, or a combination thereof. This allows cloud computing environment (1200) to offer infrastructure, platforms and/or software as services for which a cloud consumer does not need to maintain resources on a local computing device. It is understood that the types of computing devices (1254A-N) shown in FIG. 12 are intended to be illustrative only and that the cloud computing environment (1250) can communicate with any type of computerized device over any type of network and/or network addressable connection (e.g., using a web browser).

Figure 13:
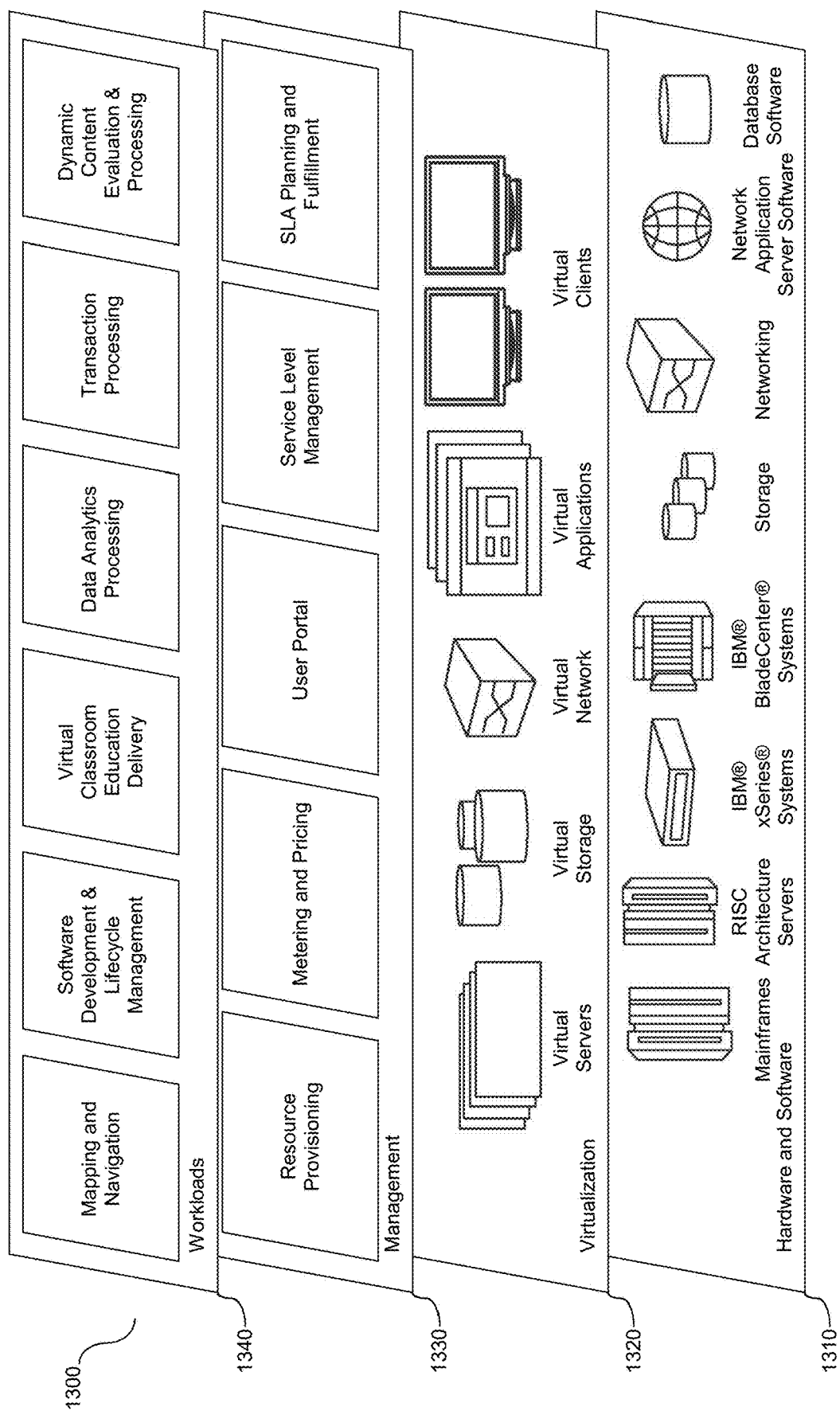
FIG. 13 depicts a block diagram illustrating a set of functional abstraction model layers provided by the cloud computing environment.

Referring now to FIG. 13, a set of functional abstraction layers (1300) provided by the cloud computing network of FIG. 12 is shown. It should be understood in advance that the components, layers, and functions shown in FIG. 13 are intended to be illustrative only, and the embodiments are not limited thereto. As depicted, the following layers and corresponding functions are provided: hardware and software layer (1310), virtualization layer (1320), management layer (1330), and workload layer (1340).

The hardware and software layer (1310) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1320) provides an abstraction layer from which the following examples of virtual entities may be provided: virtual servers; virtual storage; virtual networks, including virtual private networks; virtual applications and operating systems; and virtual clients.

In one example, management layer (1330) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1340) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and dynamic content evaluation and processing.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to resolve interrogatories with intent identification and a corresponding response related to the identified intent.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the natural language processing may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:
a processing unit operatively coupled to memory;
an artificial intelligence (AI) platform operatively coupled to the processing unit, the AI platform to support natural language processing (NLP), including:
a source manager to search one or more intents from a source feed, and to translate the one or more intents into one or more actions, the one or more actions executable by a pipeline template, wherein the pipeline template comprises one or more stages, with each stage having the one or more actions;
a cognitive assessment tool, operatively coupled to the source manager, to refine one or more of the searched intents and to match at least one pipeline tool to the refined one or more intents; and
a pipeline manager to dynamically modify the pipeline template, including integrate the matched tool into an identified stage of the pipeline template; and
program code aligned with the dynamically modified pipeline template.

2. The system of claim 1, further comprising a dialogue manager, operatively coupled to the cognitive assessment tool, the dialogue manager to search one or more mediums of communication and associated content related to the identified one or more intents and map the identified one or more intents into one or more actions.

3. The system of claim 2, further comprising the dialogue manager to leverage a natural language processing tool (NLP) to identify a key term present in the one or more mediums of communication, and selectively match the identified key term with at least one stage of the pipeline template.

4. The system of claim 3, further comprising the cognitive assessment tool to recommend an additional pipeline tool for the selectively matched stage of the template, and dynamically modify the generated program code with the recommended additional tool.

5. The system of claim 3, wherein the selective match of the identified term with at least one stage of the pipeline template includes the cognitive assessment tool to consult a domain model mapping one or more actions to one or more key terms.

6. The system of claim 1, further comprising the cognitive assessment tool to evaluate the pipeline for quality control, and introduce a reverse assessment to evaluate behavior of the pipeline, including one or more stage and tools, and align the generated program code with the evaluated behavior, including selectively amend one or more tools embedded into the generated program code.

7. A computer program product to integrate natural language processing (NLP) with pipeline application development, the computer program product comprising a computer readable storage medium having program code embodied therewith, the program code executable by a processor to:
   search one or more intents from a source feed, and to translate the one or more intents into one or more actions, the one or more actions executable by a pipeline template, wherein the pipeline template comprises one or more stages, with each stage having the one or more actions;
   refine one or more of the searched intents and to match at least one pipeline tool to the refined one or more intents; and
   dynamically modify the pipeline template, including integrate the matched tool into an identified stage of the pipeline template; and
   align program code with the dynamically modified pipeline template.

8. The computer program product of claim 7, further comprising program code to search one or more mediums of communication and associated content related to the identified one or more intents and map the identified one or more intents into one or more actions.

9. The computer program product of claim 8, further comprising program code to leverage a natural language processing tool (NLP) to identify a key term present in the one or more mediums of communication, and selectively match the identified key term with at least one stage of the pipeline template.

10. The computer program product of claim 9, further comprising program code to recommend an additional pipeline tool for the selectively matched stage of the template, and dynamically modify the generated program code with the recommended additional tool.

11. The computer program product of claim 9, wherein the selective match of the identified term with at least one stage of the pipeline template includes program code tool to consult a domain model mapping one or more actions to one or more key terms.

12. The computer program product of claim 7, further comprising program code to evaluate the pipeline for quality control, and introduce a reverse dialogue assessment to evaluate behavior of the pipeline, including one or more stage and tools, and align the generated program code with the evaluated behavior, including selectively amend one or more tools embedded into the generated program code.

13. A method comprising:
   using a source control system, mining one or more intents and translating the identified one or more intents into one or more actions executable by a pipeline template, the pipeline template having one or more stages, with each stage having one or more actions;
   feeding the one or more pipeline template stages into a cognitive assessment tool to further refine one or more of the intents, and matching at least one additional tool to the further defined one or more intents;
   dynamically modifying the pipeline template, including integrating the matched at least one additional tool into an identified stage of the pipeline template;
   generating program code aligned with the dynamically modified template; and
   deploying the generated program code with one or more processing devices.

14. The method of claim 13, further comprising mining one or more mediums of communication and associated content related to the identified one or more intents and mapping the identified one or more intents into one or more actions.

15. The method of claim 14, further comprising leveraging a natural language processing tool (NLP) for identifying a key term present in the one or more mediums of communication, and selectively matching the identified key term with at least one stage of the pipeline template.

16. The method of claim 15, further comprising recommending an additional tool for the selectively matched stage of the template, and dynamically modifying the generated program code with the recommended additional tool.

17. The method of claim 15, wherein the selective matching of the identified term with at least one stage of the pipeline template includes consulting a domain model mapping one or more actions to one or more key terms.

18. The method of claim 13, further comprising evaluating the pipeline for quality control, and introducing a reverse dialogue assessment for evaluating behavior of the pipeline, including one or more stage and tools, and aligning the generated program code with the evaluated behavior, including selectively amending one or more tools embedded into the generated program code.

\* \* \* \* \*